US012660924B2

(12) United States Patent
Ding et al.

(10) Patent No.: US 12,660,924 B2
(45) Date of Patent: Jun. 23, 2026

(54) DETACHABLE AND MULTI-STRUCTURED FENCE CHAIR

(71) Applicant: Anji Longwin Furniture Co., Ltd., Huzhou City (CN)

(72) Inventors: Chen Ding, Huzhou City (CN); Zhongjian Huang, Huzhou City (CN); Chunli Zang, Huzhou City (CN); Hu Zhou, Huzhou City (CN)

(73) Assignee: Anji Longwin Furniture Co., Ltd., Huzhou City (CN)

( * ) Notice: Subject to any disclaimer, the term of this patent is extended or adjusted under 35 U.S.C. 154(b) by 139 days.

(21) Appl. No.: 18/750,272

(22) Filed: Jun. 21, 2024

(65) Prior Publication Data

US 2025/0331639 A1      Oct. 30, 2025

(30) Foreign Application Priority Data

Apr. 24, 2024   (CN) .......................... 202410496248.5

(51) Int. Cl.
*A47C 4/02*            (2006.01)
*F16B 12/10*          (2006.01)

(52) U.S. Cl.
CPC .............. *A47C 4/021* (2013.01); *A47C 4/028* (2013.01); *F16B 12/10* (2013.01); *F16B 2012/106* (2013.01)

(58) Field of Classification Search
CPC ........... A47C 4/028; A47C 7/002; A47C 4/02; A47C 4/021; A47C 4/022; F16B 12/10
See application file for complete search history.

(56) References Cited

U.S. PATENT DOCUMENTS

| | | | | |
|---|---|---|---|---|
| 3,704,911 A | * | 12/1972 | Milakovich .............. | A47C 4/02 297/440.16 |
| 5,890,767 A | * | 4/1999 | Chang .................... | A47C 7/546 297/440.22 |
| 6,942,298 B2 | * | 9/2005 | Harrison ................ | A47C 17/04 297/440.1 |
| 8,646,843 B2 | * | 2/2014 | Koch ..................... | A47C 4/028 297/440.14 |
| 2007/0132301 A1 | * | 6/2007 | Yu ............................ | A47C 4/02 297/440.23 |
| 2022/0087429 A1 | * | 3/2022 | Gunawan ................. | A47C 5/10 |
| 2025/0331640 A1 | * | 10/2025 | Ding ..................... | A47C 7/546 |

* cited by examiner

*Primary Examiner* — Alfred J Wujciak
(74) *Attorney, Agent, or Firm* — Olive Law Group, PLLC

(57) ABSTRACT

The present disclosure belongs to the technical field of furniture, and particularly relates to a detachable and multi-structured fence chair. The present disclosure provides a detachable and multi-structured fence chair, which structurally includes a flip-over backrest frame body for mounting of connecting members via connecting slots formed in a back side of the flip-over backrest frame body, and two armrest frame bodies respectively connected to two sides of the flip-over backrest frame body via the connecting members. The detachable and multi-structured fence chair has the outstanding advantage that the method for forming the connecting slots in the back side of the flip-over backrest frame body allows for the implementation of connection methods that are previously inconvenient for installation, such as threaded joint or nail engagement, on the detachable fence chair, despite having relatively high connection strength, thus ultimately ensuring that the detachable and multi-structured fence chair has prolonged service life.

19 Claims, 13 Drawing Sheets

DETACHABLE AND MULTI-STRUCTURED FENCE CHAIR

CROSS REFERENCE TO RELATED APPLICATION

This application claims priority to Chinese Patent Application No. 2024104962485, filed Apr. 24, 2024, the disclosure of which is incorporated herein by reference in its entirety.

TECHNICAL FIELD

The present disclosure belongs to the technical field of furniture, and particularly relates to a detachable and multi-structured fence chair.

BACKGROUND ART

A chair consists essentially of a seat plate, a backrest, armrests, and supporting feet. A fence chair, as a relatively special type of chair, generally refers to a chair with a backrest and armrests that are connected together.

Consequently, the fence chair is distinctively characterized by its highly enclosed and well-wrapped properties, and gaps that were originally present between the backrest and the armrests have been eliminated, making items less likely fall off at a rear end of the fence chair.

On the other hand, with respect to categorizing according to whether disassembly and assembly are available, the types of the fence chair may be roughly divided into a detachable type and a one-piece type. The primary advantage of the former is convenient for storage and transport, with a relatively smaller volume of space occupied during storage and transport.

Accordingly, the primary problems that need to be solved in the structure of the detachable fence chair are firstly how to achieve higher structural strength, at least ensuring that it is not significantly lower than that of a one-piece fence chair; and secondly, how to reduce mounting difficulty, and ensure that the chair may be assembled quickly by consumers after purchase.

For example, the Chinese utility model patent with Authorized Announcement No. CN217337946U and Date of Authorized Announcement of Sep. 2, 2022 has disclosed a detachable sofa chair, which structurally includes a seat frame, a backrest, armrests, and a seat cushion, movable inserting fasteners are connected between an end face of the backrest and end faces of the armrests, detachable locking members are fixedly connected between the seat frame and the backrest and between the seat frame and the armrests, and the seat cushion covers a top of the seat frame.

The detachable sofa chair of the utility model patent is essentially a fence chair, and has the following advantages of being convenient to carry and transport in batches on the basis of ensuring attractiveness.

However, during the actual use of the detachable sofa chair, it at least has the following deficiency, which is also the technical problem to be solved by the present disclosure, that is, For the sake of convenience for mounting, the mounting means may only be defined as inserted joint between the backrest and the armrests, i.e., the above movable inserting fasteners. The largest drawback of this means, compared to means such as threaded joint, is relatively low in connection strength, which is inadequate to fully restrict relative displacement between the backrest and the armrests along a vertical direction. The inserted joint is even more prone to causing loosening in a connection structure between the backrest and the armrests, which ultimately shortens the effective service life of the detachable sofa chair.

Therefore, in summary, there is an urgent need for a novel detachable fence chair which is convenient to mount and relatively high in strength of a mounting and connection structure.

SUMMARY

The present disclosure provides a detachable and multi-structured fence chair, which structurally includes a flip-over backrest frame body for mounting of connecting members via connecting slots formed in a back side of the flip-over backrest frame body, and two armrest frame bodies respectively connected to two sides of the flip-over backrest frame body via the connecting members. The detachable and multi-structured fence chair has the outstanding advantage that the method for forming the connecting slots in the back side of the flip-over backrest frame body allows for the implementation of connection methods that are previously inconvenient for installation, such as threaded joint or nail engagement, on the detachable fence chair, despite having relatively high connection strength, thus ultimately ensuring that the detachable and multi-structured fence chair has prolonged service life.

A technical solution of the present disclosure to solve the above problems is that a detachable and multi-structured fence chair structurally includes a flip-over backrest frame body for mounting of connecting members via connecting slots formed in a back side of the flip-over backrest frame body, and two armrest frame bodies respectively connected to two sides of the flip-over backrest frame body via the connecting members.

In a further preferred technical solution: the flip-over backrest frame body includes a backrest bottom plate, two backrest side plates respectively arranged at two ends of the backrest bottom plate, a backrest top plate arranged on the two backrest side plates, mounting holes formed in the backrest side plates and used for mounting the connecting members, and a backrest front end supporting plate arranged on the backrest bottom plate, the backrest side plates and the backrest top plate for constituting the connecting slots.

In a further preferred technical solution: the flip-over backrest frame body further includes a fixed protective sleeve arranged on the backrest side plates, the backrest top plate and the backrest front end supporting plate, and a flip-open sheet arranged on the fixed protective sleeve and used for covering the connecting slots.

In a further preferred technical solution: the flip-over backrest frame body further includes a vertical reinforcing plate arranged on the backrest bottom plate and the backrest top plate, and a transverse reinforcing plate arranged on the two backrest side plates.

In a further preferred technical solution: the armrest frame body includes an armrest bottom plate, a front end side plate and a rear end side plate which are arranged at two ends of the armrest bottom plate respectively, an armrest top plate arranged on the front end side plate and the rear end side plate, and embedded members arranged on the rear end side plate and used for being connected with the mounting holes via the connecting members, the connecting members are bolts, and the embedded members are embedded nuts.

In a further preferred technical solution: the demountable and multi-structured fence chair structurally further includes a front end barrier frame body and a rear end support cross bar, for which two ends are respectively arranged on the two armrest frame bodies, and a seat cushion arranged on the front end barrier frame body and the rear end support cross bar.

In a further preferred technical solution: the front end barrier frame body includes a vertical plate and two lateral slotting snap-fit sheets respectively arranged at two ends of the vertical plate; and the armrest frame body further includes a front end plate with the connecting members, which is arranged on the armrest bottom plate and the front end side plate and used for supporting the lateral slotting snap-fit sheets.

In a further preferred technical solution: the armrest frame body further includes a rear end plate with the embedded members, which is arranged on the armrest bottom plate and used for being connected with the rear end support cross bar.

In a further preferred technical solution: reinforcing holes are formed in both the rear end support cross bar and the seat cushion.

In a further preferred technical solution: the flip-over backrest frame body further includes hook and loop fasteners arranged on the backrest bottom plate, the backrest side plates, and the flip-open sheet.

In a further preferred technical solution: the detachable and multi-structured fence chair structurally further includes supporting feet arranged on the two armrest frame bodies, and during storage and transport, the supporting feet are arranged on an inner side of the flip-open sheet.

In a further preferred technical solution: the armrest frame body further includes reinforcing plates arranged on the armrest bottom plate and the armrest top plate and used for being connected with the rear end plate with the embedded members.

In a further preferred technical solution: the armrest frame body further includes a vertical connecting plate arranged on the armrest bottom plate and the armrest top plate.

In a further preferred technical solution: the armrest frame body further includes an armrest supporting plate arranged on the armrest bottom plate, the front end side plate, the rear end side plate, and the armrest top plate.

In a further preferred technical solution: the flip-over backrest frame body further includes a frame body covering cloth on which the hook and loop fasteners are arranged.

In a further preferred technical solution: the armrest frame body further includes an overall protective sleeve arranged on the armrest bottom plate, the front end side plate, the rear end side plate, the armrest top plate, and the armrest supporting plate.

In a further preferred technical solution: the front end barrier frame body further includes a projection block arranged on an inner side surface of the vertical plate and used for supporting the seat cushion.

In a further preferred technical solution: perforated plates for being connected with the rear end plate with the embedded members are arranged at two ends of the rear end support cross bar.

In a further preferred technical solution: during storage and transport of the detachable and multi-structured fence chair, the flip-over backrest frame body, the armrest frame bodies and the seat cushion are stacked up along a vertical direction.

In a further preferred technical solution: the embedded members are further arranged on the armrest bottom plate.

Figure 1:
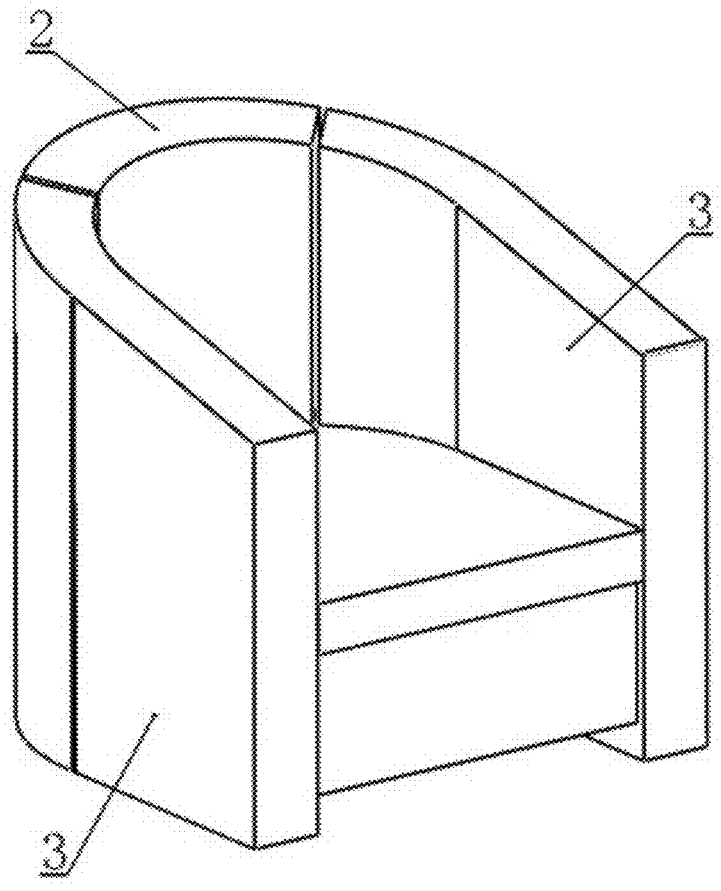
FIG. 1 is a structural schematic diagram according to the present disclosure.
Figure 2:
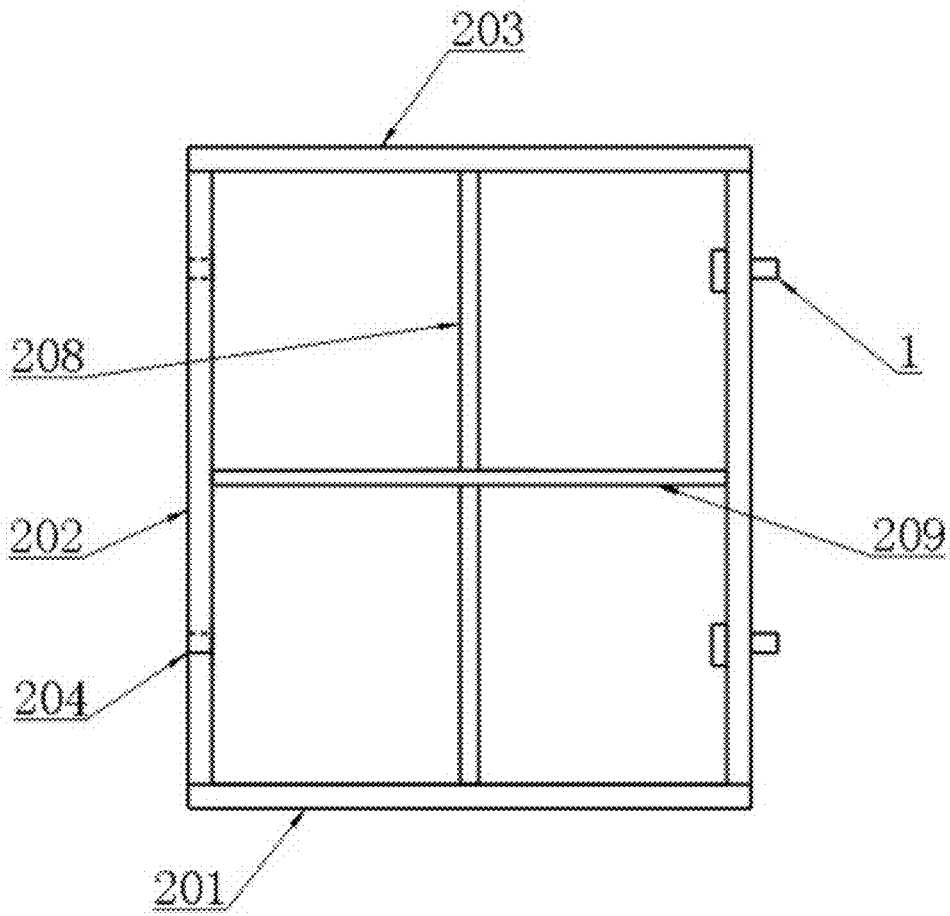
FIG. 2 is a schematic structural diagram illustrating a flip-over backrest frame body according to the present disclosure.
Figure 3:
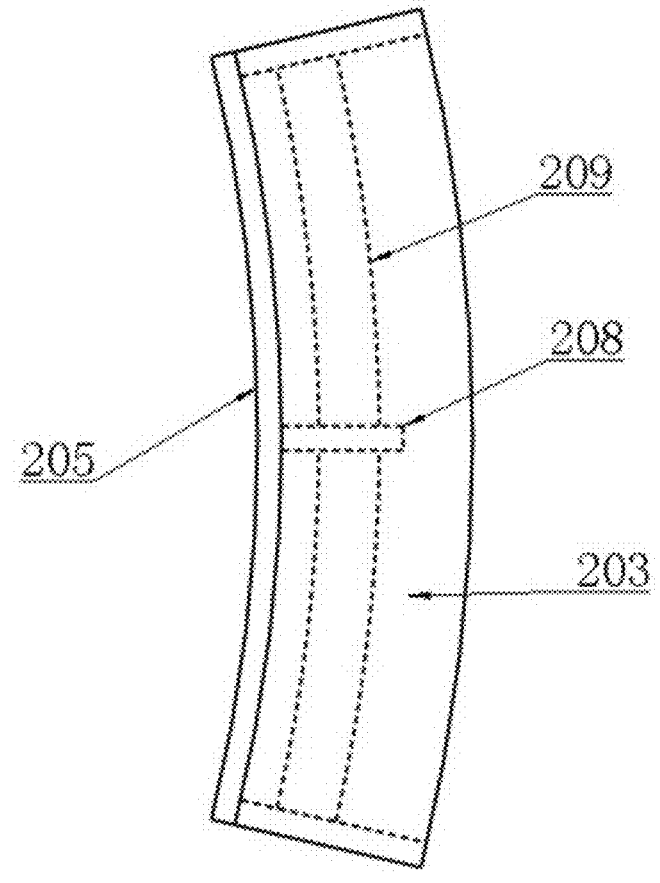
FIG. 3 is a schematic diagram illustrating a position and a shape of a backrest front end supporting plate according to the present disclosure as viewed from a top.
Figure 4:
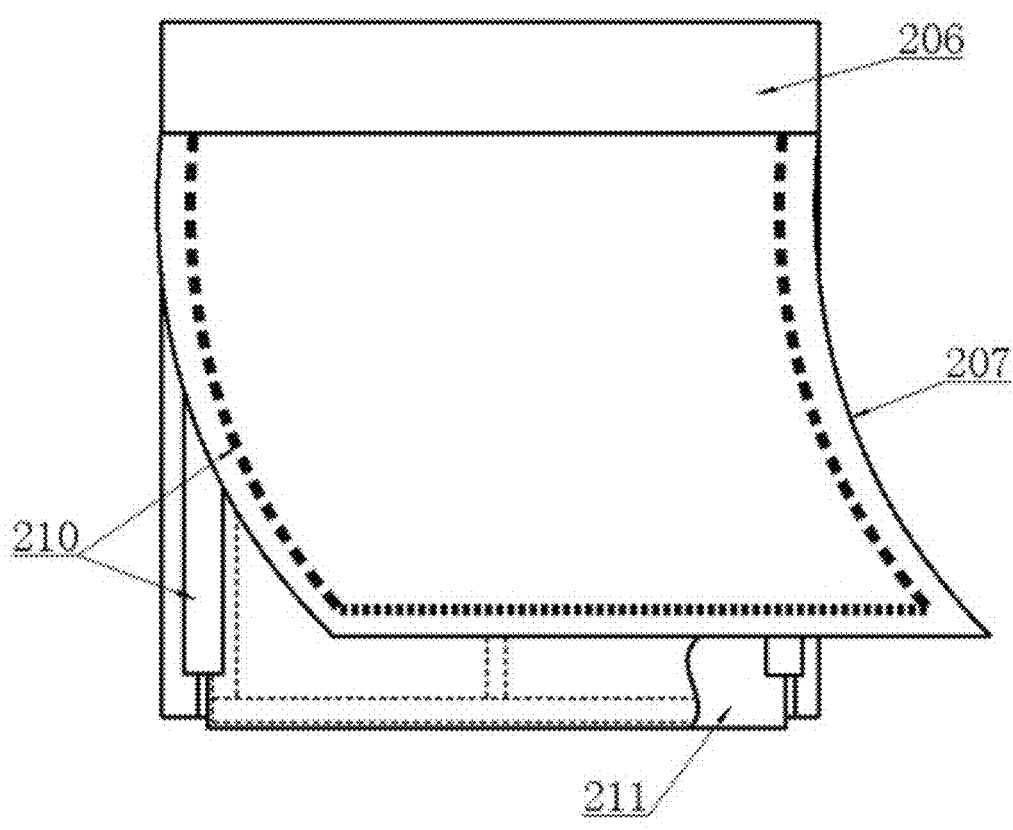
FIG. 4 is a schematic diagram illustrating a position and a shape of a flip-open sheet and hook and loop fasteners according to the present disclosure.
Figure 5:
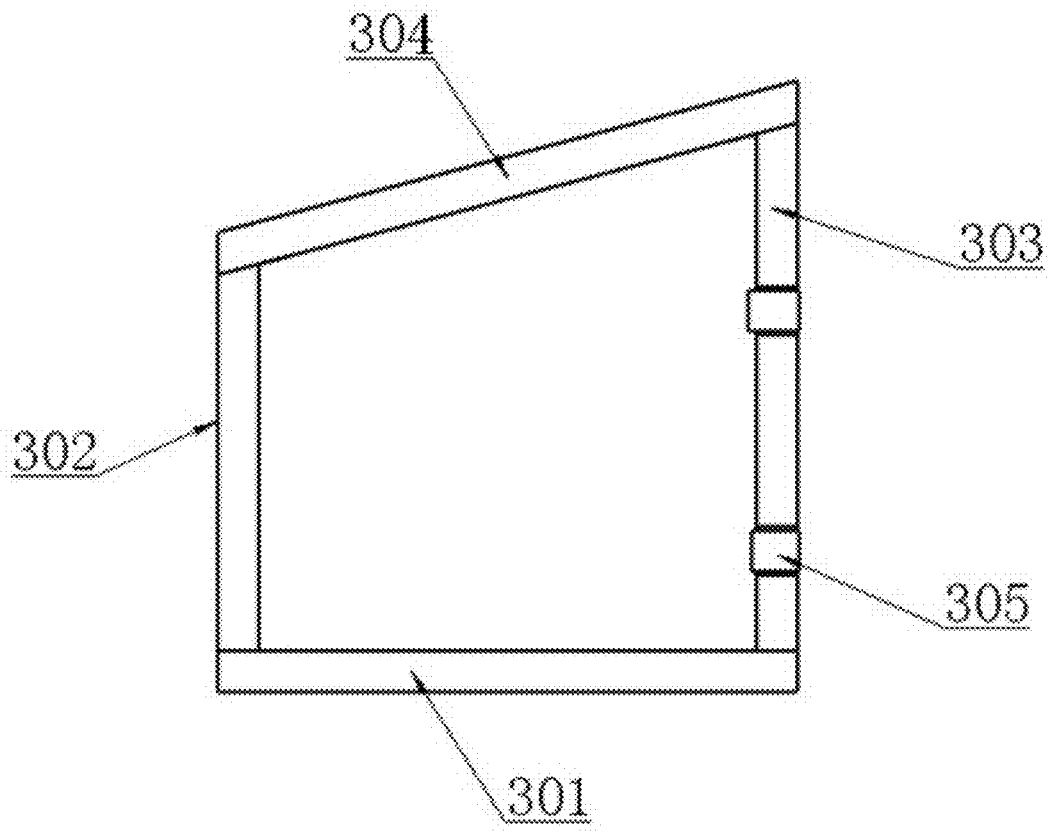
FIG. 5 is a structural schematic diagram illustrating an armrest frame body according to the present disclosure.
Figure 6:
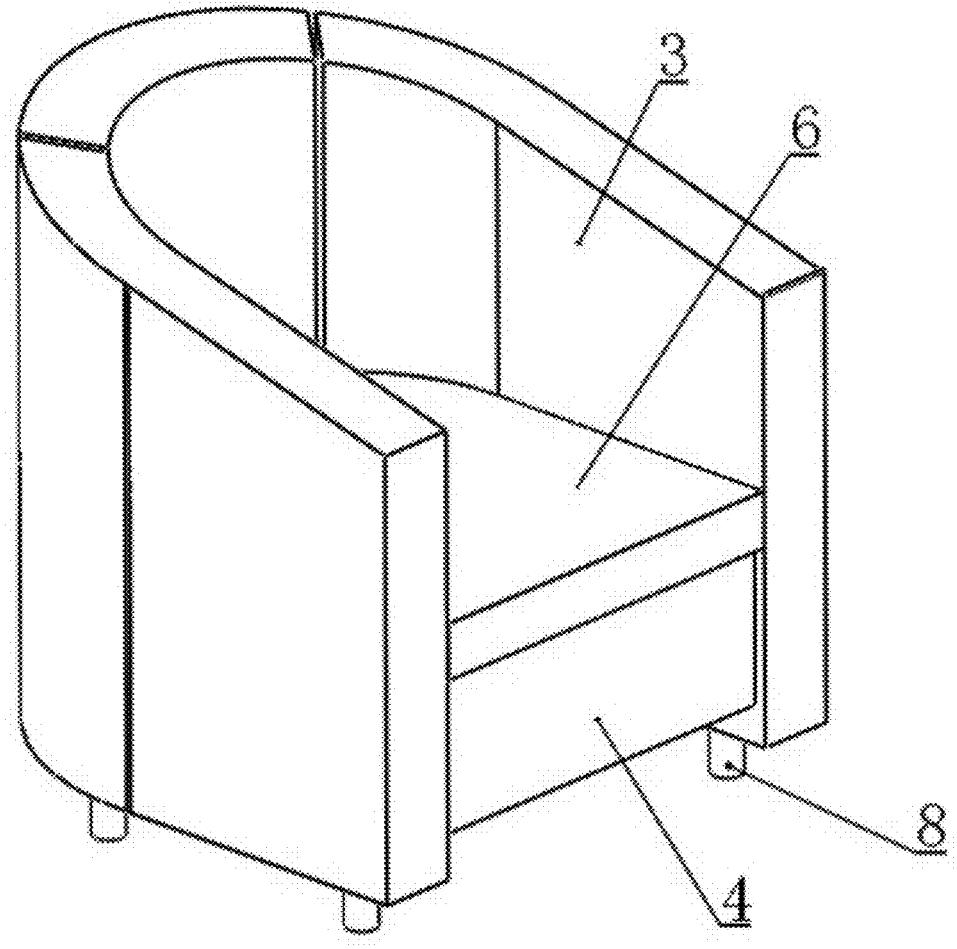
FIG. 6 is a schematic diagram illustrating positions of a front end barrier frame body and a seat cushion according to the present disclosure.
Figure 7:
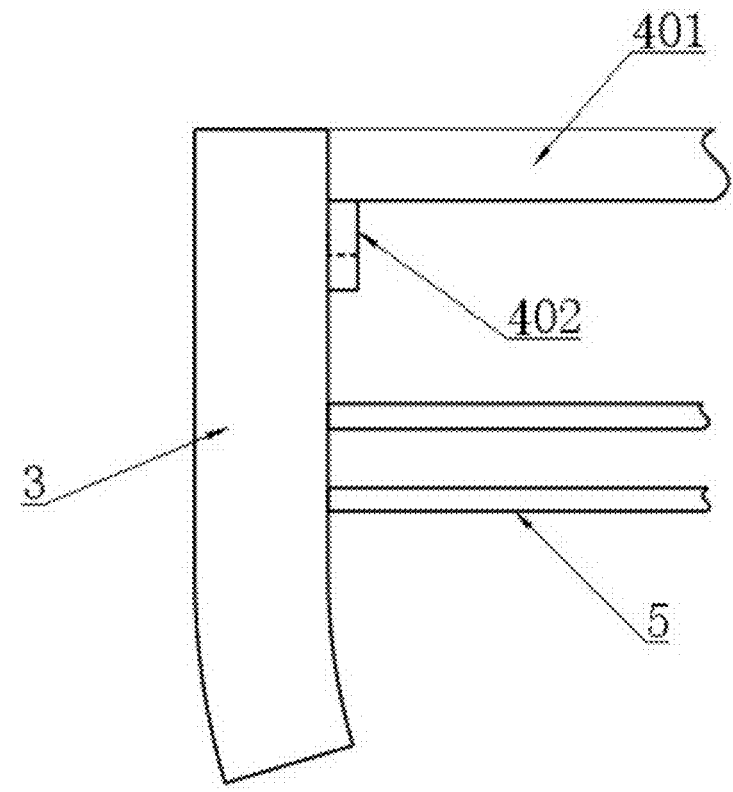
FIG. 7 is a schematic diagram illustrating a position of a rear end support cross bar according to the present disclosure as viewed from a top.
Figure 8:
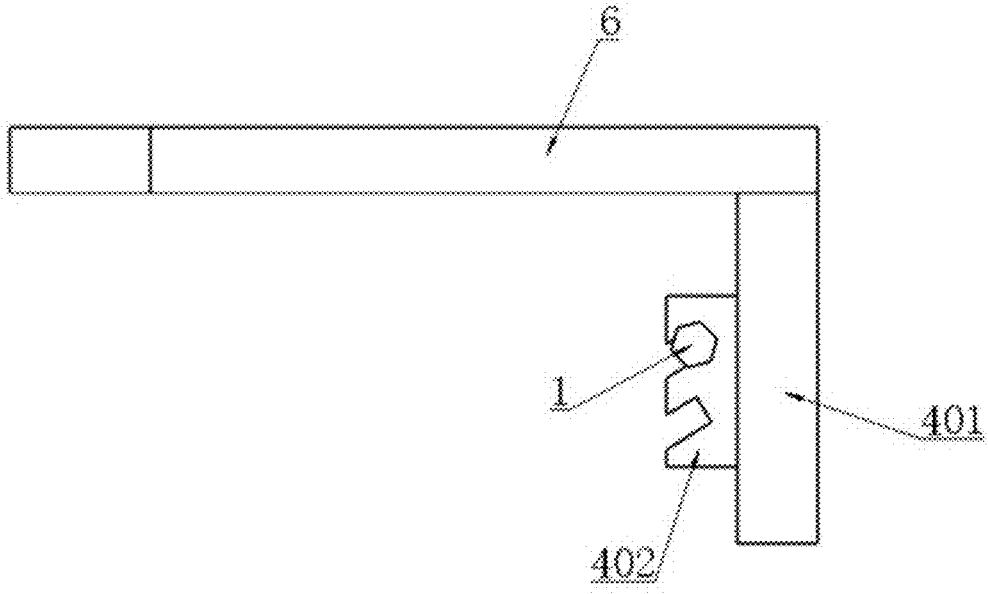
FIG. 8 is a schematic diagram illustrating a position and a shape of a lateral slotting snap-fit sheet according to the present disclosure.
Figure 9:
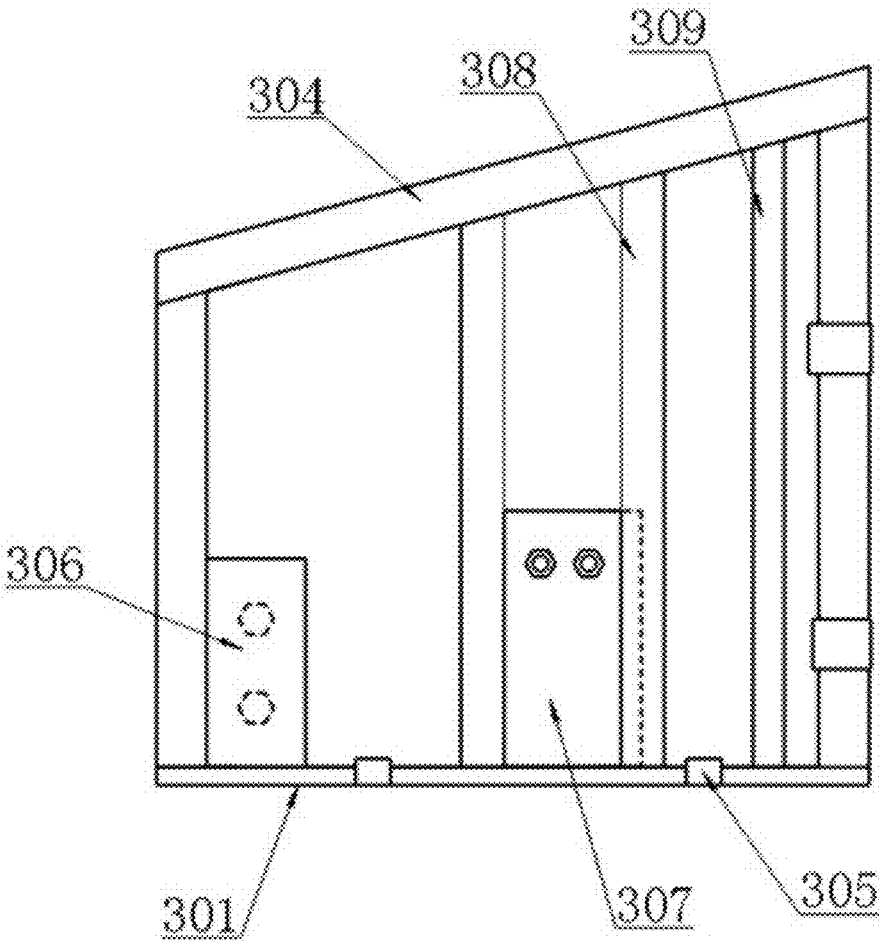
FIG. 9 is a schematic diagram illustrating positions and shapes of a front end plate with connecting members and a rear end plate with embedded members according to the present disclosure.
Figure 10:
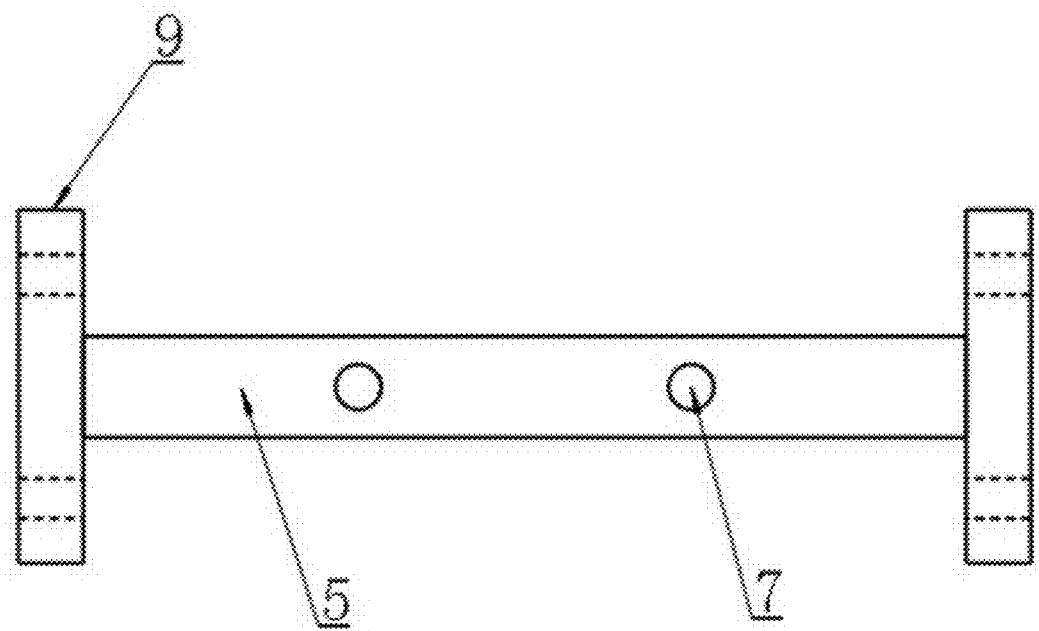
FIG. 10 is a schematic diagram illustrating positions and shapes of reinforcing holes and perforated plates according to the present disclosure as viewed from a top.
Figure 11:
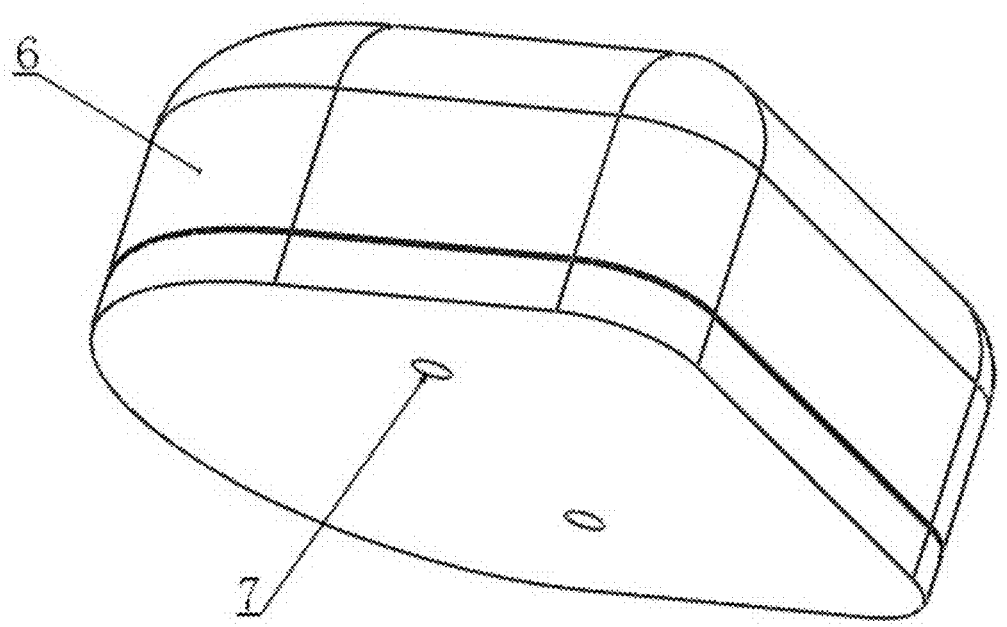
FIG. 11 is a schematic diagram illustrating positions of reinforcing holes in a seat cushion according to the present disclosure.
Figure 12:
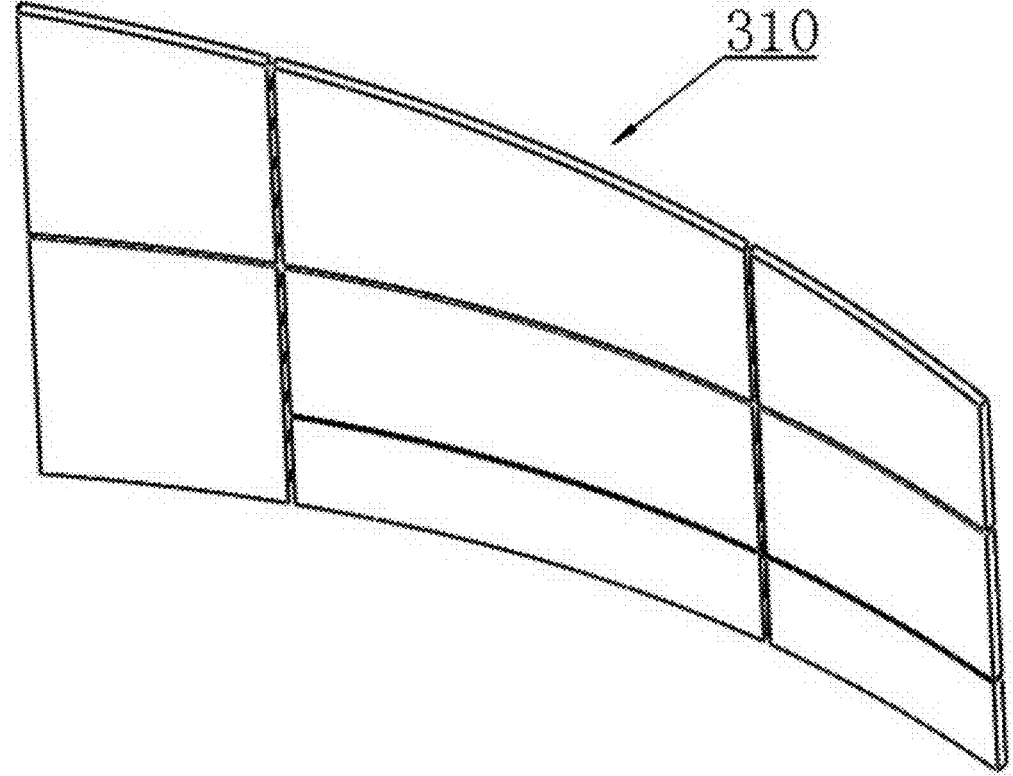
FIG. 12 is a schematic diagram illustrating a shape of an armrest supporting plate according to the present disclosure.
Figure 13:
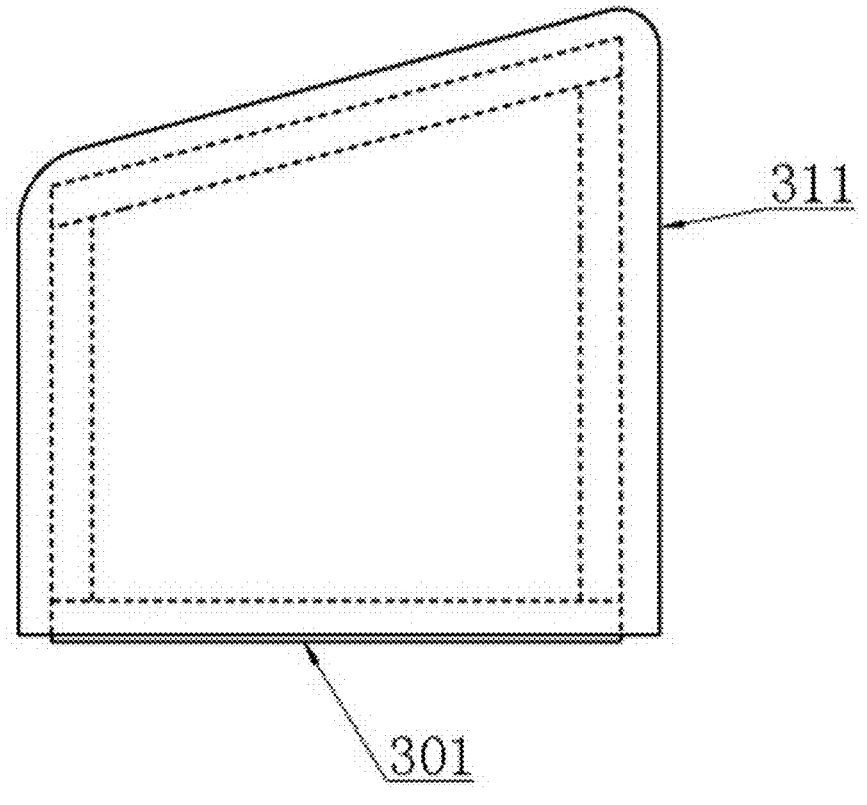
FIG. 13 is a schematic diagram illustrating a position and a shape of an overall protective sleeve according to the present disclosure.
Figure 14:
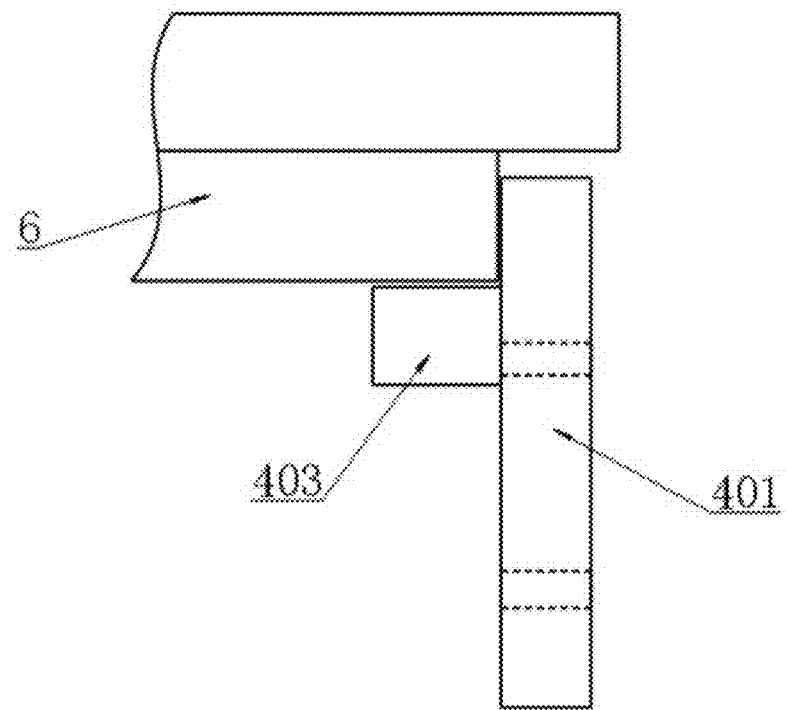
FIG. 14 is a schematic diagram illustrating a function of a projection block according to the present disclosure.
Figure 15:
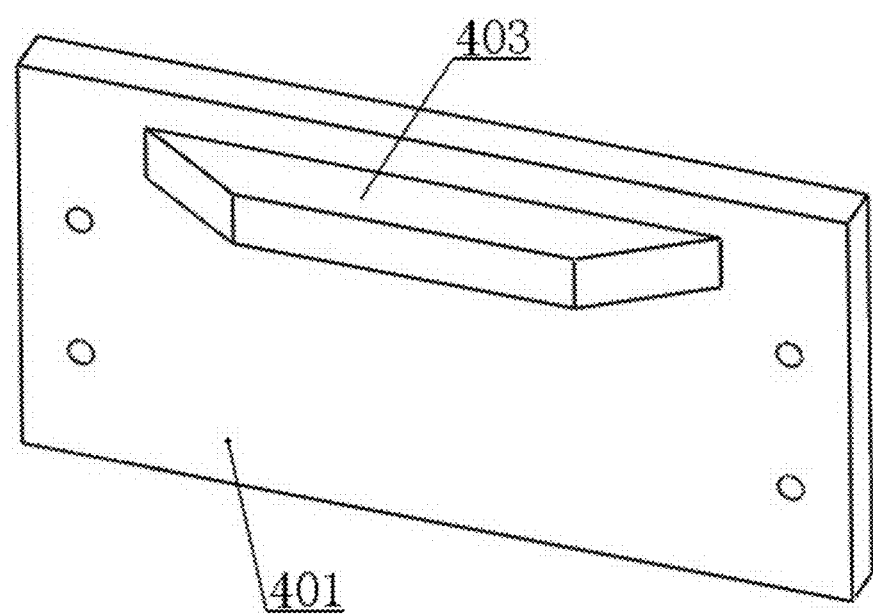
FIG. 15 is a structural schematic diagram illustrating a front end barrier frame body according to the present disclosure.

In the drawings, the meanings of reference signs are as follows:

Packaging box a;

Connecting member 1, flip-over backrest frame body 2, armrest frame body 3, front end barrier frame body 4, rear end support cross bar 5, seat cushion 6, reinforcing hole 7, supporting foot 8, and perforated plate 9;

Backrest bottom plate 201, backrest side plate 202, backrest top plate 203, mounting hole 204, backrest front end supporting plate 205, fixed protective sleeve 206, flip-open sheet 207, vertical reinforcing plate 208, transverse reinforcing plate 209, hook and loop fastener 210, and frame body covering cloth 211;

Armrest bottom plate 301, front end side plate 302, rear end side plate 303, armrest top plate 304, embedded member 305, front end plate 306 with connecting members, rear end plate 307 with embedded members, reinforcing plate 308, vertical connecting plate 309, armrest supporting plate 310, and overall protective sleeve 311;

Vertical plate 401, lateral slotting snap-fit sheet 402, and projection block 403.

DETAILED DESCRIPTION OF THE EMBODIMENTS

The following descriptions are only the preferred embodiments of the present disclosure, but are not construed as limiting the scope of the present disclosure.

As shown in FIGS. 1-17, a detachable and multi-structured fence chair structurally includes a flip-over backrest frame body 2 for mounting of connecting members 1 via connecting slots formed in a back side of the flip-over backrest frame body, and two armrest frame bodies 3 respectively connected to two sides of the flip-over backrest frame body 2 via the connecting members 1.

In this embodiment, the flip-over backrest frame body 2 replaces a commonly used "one-piece plate" structure with a "slotted" structure. Therefore, the connecting members 1 that are internally mounted may be connected to the armrest frame bodies 3.

Or else, connection between the backrest and the armrests may only be made on opposite sides of both, which is a connection way that is less sufficient in strength.

In this connection way, both the flip-over backrest frame body 2 and the armrest frame bodies 3 are primarily made of wood, and flexible packaging materials are added thereon as needed to achieve fundamental functions of the fence chair.

Additionally, the above connecting slot refers to an operational position for the mounting and removal of the connecting member 1, where a rectangular slot with only one side opened is formed, and the opening of the slot corresponds to a back side of the fence chair.

Finally, the structure and function of the connecting member 1 are essentially metal hardware, with a minimum quantity of 4, pairs of which are respectively located at mounting positions on either side of the flip-over backrest frame body 2.

The flip-over backrest frame body 2 includes a backrest bottom plate 201, two backrest side plates 202 respectively arranged at two ends of the backrest bottom plate 201, a backrest top plate 203 arranged on the two backrest side plates 202, mounting holes 204 formed in the backrest side plates 202 and used for mounting the connecting members 1, and a backrest front end supporting plate 205 arranged on the backrest bottom plate 201, the backrest side plates 202 and the backrest top plate 203 for constituting the connecting slots.

In this embodiment, both the backrest bottom plate 201 and the backrest top plate 203 have a certain curvature, and both may be in the form of an annular sector plate body. A shorter arcuate side of the annular sector serves as a front end of the fence chair, while a longer arcuate side serves as a rear end of the fence chair.

Additionally, the backrest bottom plate 201, the two backrest side plates 202 and the backrest top plate 203 are sequentially connected by gun nails, and a triangular reinforcing plate may also, as needed, be arranged at an included angle between any two of the plates.

Wherein a direct "support" object of the backrest front end supporting plate 205 is the flexible packaging material on the backrest, and an ultimate "support" object is a user. The backrest front end supporting plate, which is bent from a rectangular plate, is connected with a backrest frame consisting of the backrest bottom plate 201, the two backrest side plates 202, and the backrest top plate 203 by the gun nails.

Finally, the backrest front end supporting plate 205 may also be formed by a plurality of irregularly shaped thin plates spliced together, which is thinner than the backrest bottom plate 201, the two backrest side plates 202, and the backrest top plate 203.

The flip-over backrest frame body 2 further includes a fixed protective sleeve 206 arranged on the backrest side plates 202, the backrest top plate 203 and the backrest front end supporting plate 205, and a flip-open sheet 207 arranged on the fixed protective sleeve 206 and used for covering the connecting slots.

In this embodiment, the fixed protective sleeve 206 may constitute a sleeve body with an open bottom together with the flip-open sheet 207, with the fixed protective sleeve 206 located at the front, and the flip-open sheet 207 located at the back.

The fixed protective sleeve 206 is internally provided with elastic materials, such as sponge, and surface materials and colors of both are consistent, and are consistent with a surface material and a color of the armrest frame body 3, for example, a white or yellow velvet fabric, endowing the fence chair with a soft surface and a unified appearance.

Additionally, the flip-open sheet 207 is rectangular in shape, with an upper side fixedly connected to the fixed protective sleeve 206, and a lower side and two sides movably connected to the fixed protective sleeve 206, and such movable connection may be zipper connection.

At this moment, during the disassembly and assembly of the connecting members 1, the flip-open sheet 207 may be temporarily opened and lifted, and during normal use of the fence chair, the flip-open sheet 207 is lowered to be connected with the fixed protective sleeve 206, thereby covering the connecting slots, and enhancing the overall appearance of the fence chair.

The flip-over backrest frame body 2 further includes a vertical reinforcing plate 208 arranged on the backrest bottom plate 201 and the backrest top plate 203, and a transverse reinforcing plate 209 arranged on the two backrest side plates 202.

In this embodiment, at least one of the vertical reinforcing plate 208 and the transverse reinforcing plate 209 directly supports the backrest front end supporting plate 205, thus ensuring that the backrest front end supporting plate 205 is difficult to crush by the user.

The number of the vertical reinforcing plate 208 and the transverse reinforcing plate 209 is not specifically defined, for example, one vertical reinforcing plate 208 and two transverse reinforcing plates 209 may be provided.

Wherein the transverse reinforcing plate 209 has a radian that cooperates with the backrest front end supporting plate 205, and at least one of the vertical reinforcing plate 208 and the transverse reinforcing plate 209 is provided with a rabbet for snap-fitting, which ensures that the vertical reinforcing plate 208 and the transverse reinforcing plate 209 may be connected as an overall structure to jointly support the backrest front end supporting plate 205 and reinforce the overall flip-over backrest frame body 2.

The armrest frame body 3 includes an armrest bottom plate 301, a front end side plate 302 and a rear end side plate 303 which are arranged at two ends of the armrest bottom plate 301, an armrest top plate 304 arranged on the front end side plate 302 and the rear end side plate 303, and embedded members 305 arranged on the rear end side plate 303 and used for being connected with the mounting holes 204 via the connecting members 1.

In this embodiment, the material selection, connection method, flexible packaging material and flexible packaging method of the armrest frame body 3 are the same as those of the flip-over backrest frame body 2.

Wherein a length of the front end side plate 302 is less than that of the rear end side plate 303, and the armrest top plate 304 bends and inclines at the same time; and the bending serves to transitionally connect the flip-over backrest frame body 2, and the inclination serves to correspond to postures of user's arms.

Additionally, the embedded members 305 correspond to the connecting members 1 in terms of positions and quantity.

The detachable and multi-structured fence chair structurally further includes a front end barrier frame body 4 and a rear end support cross bar 5, for which two ends are respectively arranged on the two armrest frame bodies 3, and a seat cushion 6 arranged on the front end barrier frame body 4 and the rear end support cross bar 5.

In this embodiment, the front end barrier frame body 4 mainly serves to 1. reinforce connection between the two armrest frame bodies 3, 2. support the seat cushion 6 together with the rear end support cross bar 5, and 3. block space below the seat cushion of the fence chair to improve the overall appearance of the fence chair.

Wherein the rear end rear end support cross bar 5 may be a simple round bar, with two ends at least inserted into and connected with the armrest frame bodies 3, while the seat cushion 6 may be a common commercially available product, which structurally includes a rigid bottom plate and a superficial flexible packaging material.

The front end barrier frame body 4 includes a vertical plate 401 and two lateral slotting snap-fit sheets 402 respectively arranged at two ends of the vertical plate 401; and the armrest frame body 3 further includes a front end plate 306 with the connecting members, which is arranged on the armrest bottom plate 301 and the front end side plate 302 and used for supporting the lateral slotting snap-fit sheets 402.

In this embodiment, the rabbet of the lateral slotting snap-fit sheet 402 is of a right-angled trapezoid, and the rabbet inclines downwards, ensuring that the front end barrier frame body 4 may be more stably connected with the armrest frame bodies 3 after being compressed.

Wherein the front end barrier frame body 4, the flip-over backrest frame body 2, the armrest frame bodies 3, and the seat cushion 6 may be made of the same flexible packaging material with the same color, thus significantly improving the comfort level and overall appearance of the fence chair.

Finally, the front end plate 306 with the connecting members is structurally configured in such a way that the embedded members 305 and the connecting members 1 are mounted on the rectangular plate, and the connecting members 1 project inwards for snap-fitting and supporting the lateral slotting snap-fitting sheets 402.

The armrest frame body 3 further includes a rear end plate 307 with the embedded members, which is arranged on the armrest bottom plate 301 and used for being connected with the rear end support cross bar 5.

In this embodiment, the rear end plate 307 with the embedded members is structurally configured in such a way that the embedded members 305 are mounted on the rectangular plate, and the two ends of the rear end support cross bar 5 are respectively connected with the two embedded members 305, such that the rear end support cross bar 5 is stably supported along a vertical direction.

Wherein the rear end plate 307 with the embedded members may also be connected with the rear end side plate 303 by appropriately increasing the size for self-reinforcement, whereas the front end plate 306 with the connecting members is closer to the front, which may be directly connected to the front end side plate 302. The above connections are implemented by the gun nails.

Reinforcing holes 7 are formed in both the rear end support cross bar 5 and the seat cushion 6.

In this embodiment, the reinforcing holes 7 in the seat cushion 6 are threaded holes, and whether the reinforcing holes 7 in the rear end support cross bar 5 are provided with threads may be optional.

Finally, the paired reinforcing holes 7 are used in conjunction with bolts, which provide the directly placed seat cushion 6 with the advantage of being less likely to fall off.

The flip-over backrest frame body 2 further includes hook and loop fasteners 210 arranged on the backrest bottom plate 201, the backrest side plates 202, and the flip-open sheet 207.

In this embodiment, the hook and loop fastener 210 is a commercially available product, with one part of its two-piece structure attached to the flip-open sheet 207 to ensure the sufficient adhesive bonding of the flip-open sheet 207 during the normal use of the fence chair, thus preventing the exposure of the connecting slots.

Wherein the connection by the hook and loop fastener and the zipper connection each have its own advantages and disadvantages, and may be used alternatively.

The detachable and multi-structured fence chair structurally further includes supporting feet 8 arranged on the two armrest frame bodies 3.

In this embodiment, the four supporting feet 8 are provided, which are arranged on the two armrest frame bodies 3 respectively two by two to be in threaded joint with the armrest bottom plate 301.

During the storage and transport of the detachable and multi-structured fence chair, the supporting feet 8 are arranged on an inner side of the flip-open sheet 207.

In this embodiment, the flip-open sheet 207 always maintains an empty cavity state regardless of storage and transport on an inner side, or use, which may be used to accommodate all supporting feet 8 and eliminate the trouble of having to select insertion and placement positions for the supporting feet 8 within a packaging box, which is particularly practical.

The armrest frame body 3 further includes reinforcing plates 308 arranged on the armrest bottom plate 301 and the armrest top plate 304 and used for being connected with the rear end plate 307 with the embedded members.

In this embodiment, the two reinforcing plates 308 are provided, which are located on two sides of the rear end plate 307 with the embedded members, and are connected thereto via the gun nails, or a combination of the gun nails and triangular reinforcing blocks, which eliminates the need for a large size for the rear end plate 307 with the embedded members, and concurrently avoids the necessity to connect with the rear end side plate 303.

Additionally, the reinforcing plate 308 may also serve to support and reinforce the armrest top plate 304.

The armrest frame body 3 further includes a vertical connecting plate 309 arranged on the armrest bottom plate 301 and the armrest top plate 304.

In this embodiment, the one to two vertical connecting plates 309 are provided, which serve to at least support the armrest top plate 304, thus reinforcing the overall armrest frame bodies 3.

The vertical connecting plate 309 is not connected to the rear end plate 307 with the embedded members, but may be connected to the front end plate 306 with the connecting members, such that the front end side plate 302 is connected to a front end of the front end plate 306 with the connecting members, and the vertical connecting plate 309 is connected to a rear end, which in turn reinforces the front end plate 306 with the connecting members.

The armrest frame body 3 further includes an armrest supporting plate 310 arranged on the armrest bottom plate 301, the front end side plate 302, the rear end side plate 303 and the armrest top plate 304.

In this embodiment, the material, function, and connection of the armrest supporting plate 310 are the same as those of the backrest front end supporting plate 205.

However, the backrest front end supporting plate 205 is necessarily arranged compared to the armrest supporting plate 310 which may not be arranged necessarily since the user's arms do not need to be supported by the armrest supporting plate 310, but instead, may place directly on the armrest top plate 304.

The flip-over backrest frame body 2 further includes a frame body covering cloth 211 on which the hook and loop fasteners 210 are arranged.

In this embodiment, the frame body covering cloth made of the same material may also be arranged on the armrest frame body 3 in the same mounting method. The frame body covering cloth with a black color, made of a non-woven fabric, primarily serves to completely cover respective wooden frame structures of the flip-over backrest frame body 2 and the armrest frame body 3, such that bits of wood are prevented from falling off to the outside of the frame body covering cloth even if falling off from plate bodies, thus improving the user comfort of the fence chair.

Additionally, the frame body covering cloth is fixed to the above wooden frame structures by the gun nails, just like the hook and loop fastener and the zipper.

The armrest frame body 3 further includes an overall protective sleeve 311 arranged on the armrest bottom plate 301, the front end side plate 302, the rear end side plate 303, the armrest top plate 304, and the armrest supporting plate 310.

In this embodiment, the color, material, internal material, and connection method of the overall protective sleeve 311 are the same as those of the fixed protective sleeve 206, and a structure of the overall protective sleeve 311 essentially refers to a combination of structures of the fixed protective sleeve 206 and the flip-open sheet 207, wherein the combined structures are connected together in the non-openable form, forming a sleeve with an opening only in the bottom.

Certainly, the overall protective sleeve 311 may have a gap before sleeving the armrest frame bodies 3, and after further sleeving to cover the whole armrest frame bodies 3, the overall protective sleeve 311 aligns at the gap before being fixed by the gun nails, thus forming a relatively complete sleeve structure.

The front end barrier frame body 4 further includes a projection block 403 arranged on an inner side surface of the vertical plate 401 and used for supporting the seat cushion 6.

In this embodiment, one of functions of the projection block 403 is to provide an additional option for support positions of the seat cushion 6. The seat cushion 6 may be optionally pressed against the projection block 403 or the vertical plate 401.

Additionally, another function of the projection block 403 is to upgrade the original front end barrier frame body 4 having a single-plate style to a frame body structure having a composite-plate style, making the front end barrier frame body 4 more difficult to break.

Perforated plates 9 for being connected with the rear end plate 307 with the embedded members are arranged at two ends of the rear end support cross bar 5.

In this embodiment, the perforated plates 9, in cooperation with the connecting members 1, may be effectively connected to the rear end plate 307 with the embedded members.

Wherein the rear end support cross bar 5 and the two perforated plates 9 are formed integrally, and are made of high-strength steel. The perforating number and perforating positions of the single perforated plate 9 correspond to those of the embedded members on the single rear end plate 307 with the embedded members.

During the storage and transport of the detachable and multi-structured fence chair, the flip-over backrest frame body 2, the armrest frame bodies 3 and the seat cushion 6 are stacked up along the vertical direction.

In this embodiment, the fence chair has the following two outstanding advantages:

Firstly, internal connection which is unavailable in the prior art may be employed between the flip-over backrest frame body 2 and the armrest frame body 3, thus enhancing the connection strength.

Secondly, the fence chair structure is divided into four parts, including one flip-over backrest frame body 2, two armrest frame bodies 3 and one seat cushion 6, and compared with the method of pre-mounting the fence chair before packing and shipping in a factory, a packaging volume may be saved greatly.

For example, the length×width×height of a packaging box required for the method of pre-mounting the fence chair with a certain model before packing and shipping is 69 cm×63 cm×59 cm, and if the fence chair is stacked up along the vertical direction according to the above method after being disassembled, the length×width×height of the packaging box is reduced to 57 cm×54 cm×43.5 cm. Therefore, the advantage of saving the packaging volume is quite significant.

Additionally, the connecting members 1, the front end barrier frame body 4 and the rear end support cross bar 5 may be inserted into a gap of the packaging box, without additionally increasing dimensions of the packaging box.

The embedded members 305 are further arranged on the armrest bottom board 301.

In this embodiment, the connecting members are arranged on the supporting feet 8, which allows for the sufficient mounting and fixing of the supporting feet on the embedded members 305.

The connecting member 1 is a bolt, and the embedded member 305 is an embedded nut.

In this embodiment, the connecting member 1 may also serve as a nail, and the embedded member 305 is a wooden block or a rubber block with relatively high nail-holding power. The embedded nut is a commercially available product, which essentially has an internal and external double-threaded structure, external threads are used for self-screwing-in mounting, and internal threads are used for being connected with the bolts.

At this point, according to the fence chair in this embodiment, the flip-over backrest frame body 2 with the connecting slots in the back side is provided, which allows for the relatively simple and efficient application of threaded joint and nail engagement which are typically difficult to implement in an ordinary detachable fence chair. The connection strength and stability of the threaded joint and the nail engagement are far better than those of the inserted connection method.

In other words, the inserted connection method is a compromise for the existing ordinary detachable fence chair when the connection method is selected.

Figure 16:
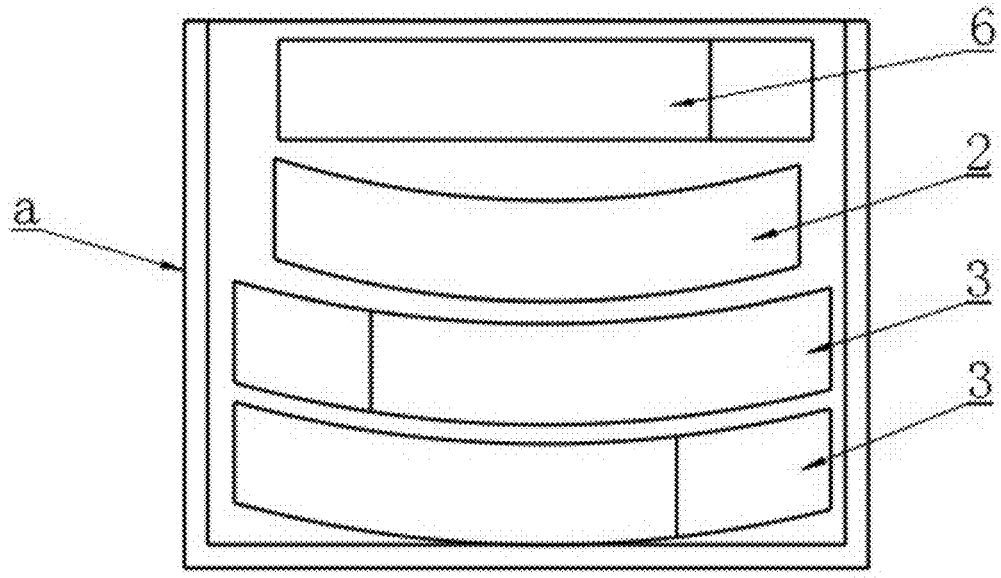
FIG. 16 is a schematic diagram illustrating storage and transport states of a detachable and multi-structured fence chair according to the present disclosure.
Figure 17:
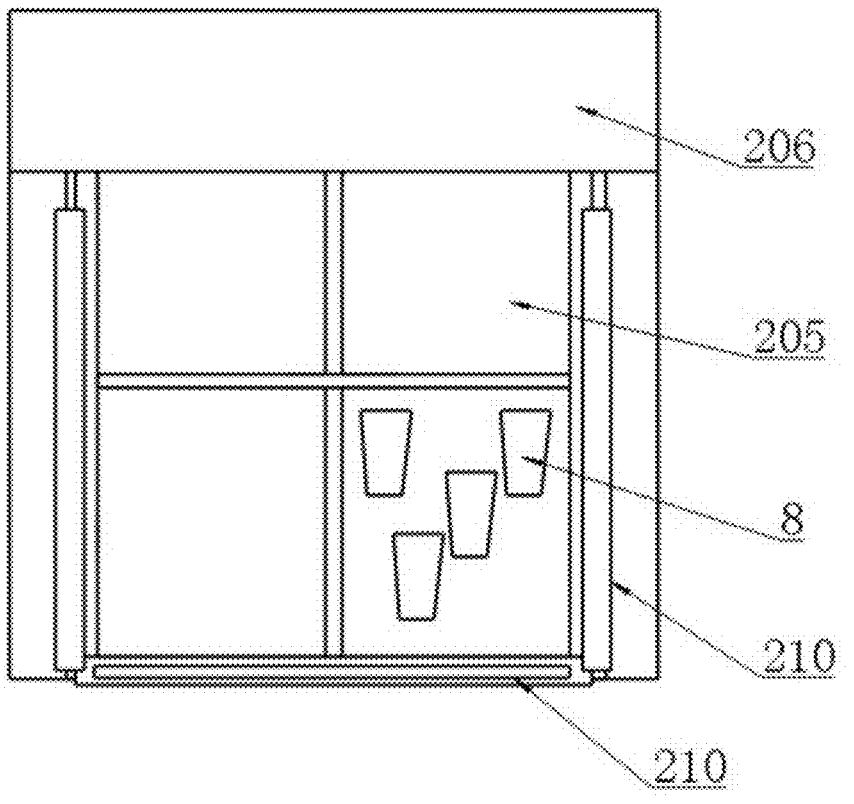
FIG. 17 is a schematic diagram illustrating accommodating positions of supporting feet during storage and transport of a detachable and multi-structured fence chair according to the present disclosure.

Furthermore, the term "multi-structured" refers to the composition of the fence chair, which primarily includes the following four structural elements: one flip-over backrest frame body 2, two armrest frame bodies 3, and one seat cushion 6. More importantly, if the fence chair is of an integrated form, the packaging volume for shipping would be relatively larger. However, if the fence chair is packaged after being disassembled, specifically as shown in FIG. 16, the packaging volume may be saved greatly.

The implementations of the present disclosure are described in detail with reference to the drawings, however, the present disclosure is not limited to these. A person ordinarily skilled in the art can also make various modifications within their knowledge range without departing from the purpose of the present disclosure. These modifications are not inventive, and are protected by patent laws as long as they fall within the scope of the claims of the present disclosure.

What is claimed is:

1. A detachable and multi-structured fence chair, structurally comprising a flip-over backrest frame body for mounting of connecting members via connecting slots formed in a side of the flip-over backrest frame body, and two armrest frame bodies respectively connected to two sides of the flip-over backrest frame body via the connecting members; the flip-over backrest frame body comprises a backrest bottom plate, two backrest side plates respectively arranged at two ends of the backrest bottom plate, a backrest top plate arranged on the backrest side plates, mounting holes formed in the backrest side plates and used for mounting the connecting members, and a backrest front end supporting plate arranged on the backrest bottom plate, the backrest side plates and the backrest top plate for constituting the connecting slots.

2. The detachable and multi-structured fence chair according to claim 1, wherein the flip-over backrest frame body further comprises a fixed protective sleeve arranged on the backrest side plates, the backrest top plate and the backrest front end supporting plate, and a flip-open sheet arranged on the fixed protective sleeve and used for covering the connecting slots.

3. The detachable and multi-structured fence chair according to claim 2, wherein the flip-over backrest frame body further comprises hook and loop fasteners arranged on the backrest bottom plate, the backrest side plates, and the flip-open sheet.

4. The detachable and multi-structured fence chair according to claim 3, wherein the flip-over backrest frame body further comprises a frame body covering cloth on which the hook and loop fasteners are arranged.

5. The detachable and multi-structured fence chair according to claim 2, wherein the detachable and multi-structured fence chair structurally further comprises supporting feet arranged on the armrest frame bodies, and during storage and transport, the supporting feet are arranged on an inner side of the flip-open sheet.

6. The detachable and multi-structured fence chair according to claim 1, wherein the flip-over backrest frame body further comprises a vertical reinforcing plate arranged on the backrest bottom plate and the backrest top plate, and a transverse reinforcing plate arranged on the backrest side plates.

7. The detachable and multi-structured fence chair according to claim 1, wherein the armrest frame body comprises an armrest bottom plate, a front end side plate and a rear end side plate which are arranged at two ends of the armrest bottom plate respectively, an armrest top plate arranged on the front end side plate and the rear end side plate, and embedded members arranged on the rear end side plate and used for being connected with the mounting holes via the connecting members, the connecting members are bolts, and the embedded members are embedded nuts.

8. The detachable and multi-structured fence chair according to claim 7, wherein the detachable and multi-structured fence chair structurally further comprises a front end barrier frame body and a rear end support cross bar, for which two ends are respectively arranged on the armrest frame bodies, and a seat cushion arranged on the front end barrier frame body and the rear end support cross bar.

9. The detachable and multi-structured fence chair according to claim 8, wherein the front end barrier frame body comprises a vertical plate and two lateral slotting snap-fit sheets respectively arranged at two ends of the vertical plate; and the armrest frame body further comprises a front end plate with the connecting members, which is arranged on the armrest bottom plate and the front end side plate and used for supporting the lateral slotting snap-fit sheets.

10. The detachable and multi-structured fence chair according to claim 9, wherein the front end barrier frame body further comprises a projection block arranged on an inner side surface of the vertical plate and used for supporting the seat cushion.

11. The detachable and multi-structured fence chair according to claim 8, wherein the armrest frame body further comprises a rear end plate with the embedded members, which is arranged on the armrest bottom plate and used for being connected with the rear end support cross bar.

12. The detachable and multi-structured fence chair according to claim 11, wherein the armrest frame body further comprises reinforcing plates arranged on the armrest bottom plate and the armrest top plate, and used for being connected with the rear end plate with the embedded members.

13. The detachable and multi-structured fence chair according to claim 11, wherein perforated plates for being connected with the rear end plate with the embedded members are arranged at two ends of the rear end support cross bar.

14. The detachable and multi-structured fence chair according to claim 8, wherein reinforcing holes are formed in both the rear end support cross bar and the seat cushion.

15. The detachable and multi-structured fence chair according to claim 8, wherein during storage and transport of the detachable and multi-structured fence chair, the flip-over backrest frame body, the armrest frame bodies and the seat cushion are stacked up along a vertical direction.

16. The detachable and multi-structured fence chair according to claim 7, wherein the armrest frame body further comprises a vertical connecting plate arranged on the armrest bottom plate and the armrest top plate.

17. The detachable and multi-structured fence chair according to claim 7, wherein the armrest frame body further comprises an armrest supporting plate arranged on the armrest bottom plate, the front end side plate, the rear end side plate, and the armrest top plate.

18. The detachable and multi-structured fence chair according to claim 17, wherein the armrest frame body further comprises an overall protective sleeve arranged on the armrest bottom plate, the front end side plate, the rear end side plate, the armrest top plate, and the armrest supporting plate.

19. The detachable and multi-structured fence chair according to claim 7, wherein the embedded members are further arranged on the armrest bottom plate.

\*    \*    \*    \*    \*